(12) United States Patent
Pan et al.

(10) Patent No.: US 12,452,187 B2
(45) Date of Patent: Oct. 21, 2025

(54) COMMUNICATION METHOD AND APPARATUS

(71) Applicant: HUAWEI TECHNOLOGIES CO., LTD., Shenzhen (CN)

(72) Inventors: Qi Pan, Beijing (CN); Zhenglei Huang, Shenzhen (CN); Hui Ni, Beijing (CN); Yongcui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 417 days.

(21) Appl. No.: 18/185,381

(22) Filed: Mar. 17, 2023

(65) Prior Publication Data

US 2023/0224253 A1    Jul. 13, 2023

Related U.S. Application Data

(63) Continuation of application No. PCT/CN2021/119960, filed on Sep. 23, 2021.

(30) Foreign Application Priority Data

Sep. 28, 2020   (CN) .......................... 202011042985.6

(51) Int. Cl.
  *H04L 47/34*   (2022.01)
  *H04L 47/24*   (2022.01)

(52) U.S. Cl.
  CPC .............. *H04L 47/34* (2013.01); *H04L 47/24* (2013.01)

(58) Field of Classification Search
  None
  See application file for complete search history.

(56) References Cited

U.S. PATENT DOCUMENTS

| 2014/0086048 A1 | 3/2014 | Jang et al. |
| 2019/0158985 A1* | 5/2019 | Dao ...................... H04W 28/04 |

(Continued)

FOREIGN PATENT DOCUMENTS

| CN | 104780028 A | 7/2015 |
| CN | 105450969 A | 3/2016 |

(Continued)

OTHER PUBLICATIONS

3GPP TS 23.501 V16.6.0 (Sep. 2020), 3rd Generation Partnership Project; Technical Specification Group Services and System Aspects; System architecture for the 5G System (5GS); Stage 2(Release 16), 447 pages.

*Primary Examiner* — Anh Vu H Ly

(57) ABSTRACT

Embodiments of this disclosure provide a communication method and apparatus, to reduce a waiting delay during transmission of retransmitted data and out-of-order data. In this method, a user plane function network element may receive first data and second data, determines, based on first information, that the second data is retransmitted data of the first data, and sends indication information to an access network network element. The indication information herein may indicate that the second data is the retransmitted data, or indicate a sending priority of the second data. Based on this solution, the access network network element may send the first data and the second data based on the indication information, and may preferentially send the retransmitted data to reduce the waiting delay during data transmission.

16 Claims, 11 Drawing Sheets

(56) References Cited

U.S. PATENT DOCUMENTS

| | | | |
|---|---|---|---|
| 2019/0223256 A1 | 7/2019 | Lin et al. | |
| 2019/0274151 A1* | 9/2019 | He | H04W 72/12 |
| 2020/0045753 A1* | 2/2020 | Dao | H04W 4/08 |
| 2020/0336960 A1* | 10/2020 | Park | H04W 8/08 |

FOREIGN PATENT DOCUMENTS

| | | |
|---|---|---|
| CN | 107889154 A | 4/2018 |
| CN | 109525376 A | 3/2019 |

\* cited by examiner

COMMUNICATION METHOD AND APPARATUS

CROSS-REFERENCE TO RELATED APPLICATIONS

This disclosure is a continuation of International Patent Application No. PCT/CN2021/119960, filed on Sep. 23, 2021, which claims priority to Chinese Patent Application No. 202011042985.6, filed on Sep. 28, 2020. The disclosures of the aforementioned applications are hereby incorporated by reference in their entireties.

TECHNICAL FIELD

This disclosure relates to the field of wireless communication technologies, and in particular, to a communication method and apparatus.

BACKGROUND

Rapid development of the new media industry leads to a sharp increase of data volume in the media industry, and this poses a challenge to a network transmission capability. For example, emerging media such as ultra-high-definition video and virtual reality (virtual reality, VR)/augmented reality (augmented reality, AR) panoramic video have high requirements on image quality and a delay, and a large amount of data may be transmitted in real time. Currently, the transmission control protocol (transmission control protocol, TCP) is reliable, and therefore is widely used for network transmission.

However, due to in-sequence delivery of TCP, an application layer obtains and parses data of a subsequent sequence number only after a data packet of a previous sequence number arrives. When data is retransmitted due to packet loss, data packets may be out of order. The out-of-order data packets may cause a client to wait during data transmission. This increases a waiting delay, and frame freezing during play is caused at a media service layer.

SUMMARY

This disclosure provides a communication method and apparatus, to reduce a waiting latency during transmission of retransmitted data and out-of-order data.

According to a first aspect, a communication method is provided. The method may be performed by a user plane function network element in an embodiment of this disclosure, or by a chip similar to the user plane function network element. In this method, the user plane function network element may receive first data and second data. The user plane function network element may determine, based on first information, that the second data is retransmitted data of the first data. The user plane function network element may send indication information to an access network network element. The indication information herein may indicate that the second data is the retransmitted data, or indicate a sending priority of the second data.

Based on this solution, the user plane function network element may determine, based on the first information, that the second data is the retransmitted data of the first data, and send the indication information to the access network network element. In this way, the access network network element may send the first data and the second data based on the indication information, and may preferentially send the retransmitted data to reduce a waiting delay during data transmission.

In a possible implementation, the user plane function network element may receive the first information from an application server. The first information may include a data packet sequence number difference threshold. For example, the first information may include a TCP sequence number difference threshold.

Based on this solution, the user plane function network element may determine, based on a data packet sequence number of the second data and the data packet sequence number difference threshold included in the first information, that the second data is the retransmitted data of the first data, and send the indication information to the access network network element, to reduce the data transmission delay.

In a possible implementation, the user plane function network element may determine that a difference between a data packet sequence number of the second data and a data packet sequence number of adjacent data exceeds the foregoing data packet sequence number difference threshold. In other words, when the difference between the data packet sequence number of the second data and the data packet sequence number of the adjacent data exceeds the data packet difference threshold, it may be determined that the second data is the retransmitted data of the first data. The data packet difference threshold may be set based on an empirical value. This is not specifically limited in this disclosure.

Based on this solution, the user plane function network element may identify the retransmitted data based on the difference between the data packet sequence number of the second data and the data packet sequence number of the adjacent data, so that the retransmitted data packet can be preferentially transmitted.

In a possible implementation, the user plane function network element may receive the first information from the access network network element. The first information may indicate a receiving response to the first data.

Based on this solution, after the user plane function network element sends the first data to the access network network element, and when receiving the receiving response from the access network network element, the user plane function network element may determine that the first data has been received and retransmission does not need to be triggered.

In a possible implementation, the user plane function network element may determine that the first information does not include the receiving response to the first data. For example, if the user plane function network element determines that a data packet sequence number of the second data is the same as that of the first data, and no receiving response to the first data is received, the user plane function network element may determine that the second data is the retransmitted data of the first data.

Based on this solution, the user plane function network element may identify the retransmitted data based on the receiving response to the first data, and may indicate, based on the indication information, the access network network element to perform priority scheduling, and preferentially transmit the retransmitted data.

In a possible implementation, the indication information may be identification information of a first quality of service (quality of service, QoS) flow. The first data may be sent through a second QoS flow, and a priority of the first QoS flow may be higher than that of the second QoS flow.

Based on this solution, the user plane function network element may indicate, based on the identification information of the QoS flow, that the second data is transmitted through the first QoS flow with a higher priority, to preferentially transmit the retransmitted data.

According to a second aspect, a communication method is provided. The method may be performed by an access network network element in embodiments of this disclosure, or by a chip whose function is similar to a function of the access network network element. In this method, the access network network element may receive first data and second data. The access network network element may receive indication information from a user plane function network element. The indication information may indicate that the second data is retransmitted data of the first data, and the access network network element may determine a sending priority of the second data based on the indication information.

Based on this solution, the access network network element may determine the sending priority of the second data based on the indication information from the user plane function network element, to perform priority scheduling, and transmit the first data and the second data.

In a possible implementation, the access network network element may determine, based on the indication information, that the sending priority of the second data is higher than that of the first data.

Based on this solution, the access network network element may determine, based on the indication information, that the sending priority of the second data is higher, so that priority scheduling is performed to preferentially transmit the second data, thereby reducing a waiting delay during data transmission.

In a possible implementation, the access network network element may receive second information from a session management function network element. The second information herein may include indication information. In this way, when the indication information from the user plane function network element is the same as the indication information from the session management function network element, the access network network element may determine that the second data is the retransmitted data of the first data.

Based on this solution, the access network network element may determine, based on the indication information from the session management function network element and the indication information from the user plane function network element, that the second data is the retransmitted data of the first data, so that priority scheduling is performed to preferentially transmit the retransmitted data, thereby reducing the waiting delay of data transmission.

In a possible implementation, the indication information may be identification information of a first QoS flow, the first data may be received through a second QoS flow, and a priority of the first QoS flow is higher than that of the second QoS flow.

Based on this solution, the access network network element may implement priority scheduling through the first QoS flow and the second QoS flow with different priorities, and may transmit the second data through the first QoS flow, to reduce a transmission delay of the retransmitted data.

According to a third aspect, a communication method is provided. The method may be performed by a policy control function network element in embodiments of this disclosure, or by a chip whose function is similar to a function of the policy control function network element. In this method, the policy control function network element may receive indication information from an application server. The policy control function network element may generate a first QoS flow and a second QoS flow based on the indication information, where the second QoS flow may be for sending first data, and the first QoS flow may be for sending second data. The second data herein may be retransmitted data of the first data. The policy control function network element may send policy information of the first QoS flow and policy information of the second QoS flow to a session management function network element, and the policy information herein may indicate that a priority of the first QoS flow is higher than that of the second QoS flow.

Based on this solution, the policy control function network element may generate the first QoS flow and the second QoS flow with different priorities based on the indication information, to transmit the first data and the second data through the QoS flows with different priorities, thereby implementing priority scheduling and reducing a data transmission delay.

According to a fourth aspect, a communication method is provided. The method may be performed by an access network network element in embodiments of this disclosure, or by a chip whose function is similar to a function of the access network network element. In this method, the access network network element may receive first data. The first data herein may include first indication information, and the first indication information may indicate a sending sequence of data packets of the first data at an application server end. The access network network element may determine a sending priority of the first data based on the first indication information.

Based on this solution, the access network network element may determine, based on the sending sequence of the data packets of the first data at the application server end, the sending priority of the first data, to perform priority scheduling and send the first data at different priorities, thereby reducing a data transmission delay.

In a possible implementation, the access network network element may receive second indication information from a session management function network element. The second indication information herein may indicate the access network network element to transmit data based on priority information.

Based on this solution, the access network network element may perform priority scheduling based on the second indication information, and send the first data in a priority order of the first data.

According to a fifth aspect, a communication method is provided. The method may be performed by an application server, or by a chip whose function is similar to a function of the application server. In the method, the application server may send first data to an access network network element through a user plane function network element. The first data herein may include first indication information. The first indication information herein may be a sending sequence of data packets of the first data at an application server end, and the first indication information may be for determining a sending priority of the first data.

Based on this method, the application server may indicate the sending priority of the first data to the access network network element based on the first indication information, so that the access network network element performs priority scheduling, and sends the first data in a priority order of the first data, thereby reducing a data transmission delay.

According to a sixth aspect, a communication apparatus is provided. The communication apparatus may include modules/units configured to perform the first aspect or any one of the possible implementations of the first aspect, or may further include modules/units configured to perform the second aspect or any one of the possible implementations of the second aspect, or may further include modules/units configured to perform the third aspect or any one of the possible implementations of the third aspect, or may further include modules/units configured to perform the fourth aspect or any one of the possible implementations of the fourth aspect, or may further include modules/units configured to perform the fifth aspect or any one of the possible implementations of the fifth aspect. For example, a communication unit and a processing unit.

According to a seventh aspect, a communication apparatus is provided, and the communication apparatus includes a processor and a memory. The memory is configured to store computer executable instructions. When a controller runs, the processor performs the computer executable instructions in the memory, to utilize a hardware resource in the controller to perform a step of the method in the first aspect or any one of the possible implementations of the first aspect, or perform a step of the method in the second aspect or any one of the possible implementations of the second aspect, or perform a step of the method in the third aspect or any one of the possible implementations of the third aspect, or perform a step of the method in the fourth aspect or any one of the possible implementations of the fourth aspect, or perform a step of the method in the fifth aspect or any one of the possible implementations of the fifth aspect.

According to an eighth aspect, this disclosure provides a computer-readable storage medium. The computer-readable storage medium stores instructions. When the instructions are run on a computer, the computer is enabled to perform the methods in the foregoing aspects.

According to a ninth aspect, this disclosure provides a computer program product that stores instructions. When the computer program product is run on a computer, the computer is enabled to perform the methods in the foregoing aspects.

In addition, for beneficial effects of the sixth aspect to the ninth aspect, refer to the beneficial effects shown in the first aspect to the fifth aspect, and details are not described herein again.

DESCRIPTION OF EMBODIMENTS

The following describes some terms in embodiments of this disclosure, to facilitate understanding of a person skilled in the art.

(1) Retransmitted data refers to data in retransmission of data sent by a device. The retransmitted data may be the same as data in the first transmission, or may be in a different redundancy version of the data in the first transmission.

(2) The terms "system" and "network" may be used interchangeably in embodiments of this disclosure. "A plurality of" means two or more, and other quantifiers are similar to this. "And/or" describes an association relationship between associated objects and indicates that three relationships may exist. For example, A and/or B may indicate the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Further, "at least one of (at least one of) . . . " means one or any combination of subsequent associated objects. For example, "at least one of A, B, and C" includes A, B, C, AB, AC, BC, or ABC.

Figure 1:
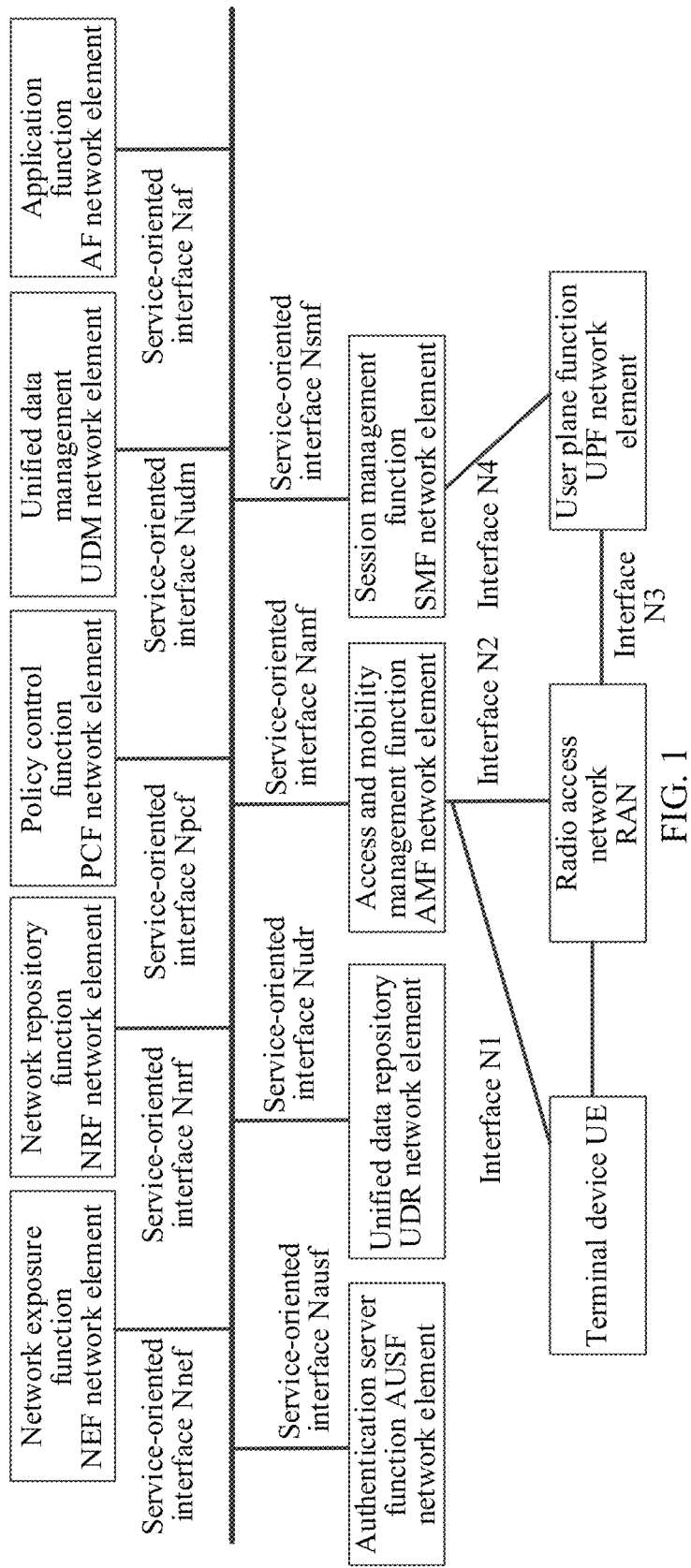
FIG. 1 shows a communication system according to an embodiment of this disclosure.

For an architecture of a possible communication system to which the communication method provided in this embodiment of this disclosure is applicable, the architecture of the communication system may include a network exposure function network element, a policy control function network element, a data management network element, an application function network element, an access and mobility management function network element, a session management function network element, a terminal device, an access network device, a user plane function network element, and a data network. FIG. 1 shows a possible example of an architecture of the communication system, and specifically includes: a network exposure function (network exposure function, NEF) network element, a policy control function (policy control function, PCF) network element, a data management (unified data management, UDM) network element, an application function (application function, AF) network element, an AMF network element, a session management function (session management function, SMF) network element, UE, an access network (access network, AN) device, a user plane function (user plane function, UPF) network element, and a data network (data network, DN). The AMF network element may be connected to the terminal device through an N1 interface, the AMF may be connected to the AN device through an N2 interface, the AN device may be connected to the UPF through an N3 interface, the SMF may be connected to the UPF through an N4 interface, and the UPF may be connected to the DN through an N6 interface. An interface name is merely an example for description. This is not specifically limited in this embodiment of this disclosure. It should be understood that this embodiment of this disclosure is not limited to the communication system shown in FIG. 1. Names of the network elements shown in FIG. 1 are merely used as examples for description herein, and do not constitute limitations on the network elements included in the architecture of the communication system to which the method in this disclosure is applicable. The following describes in detail functions of each network element or device in the communication system.

Figure 2:
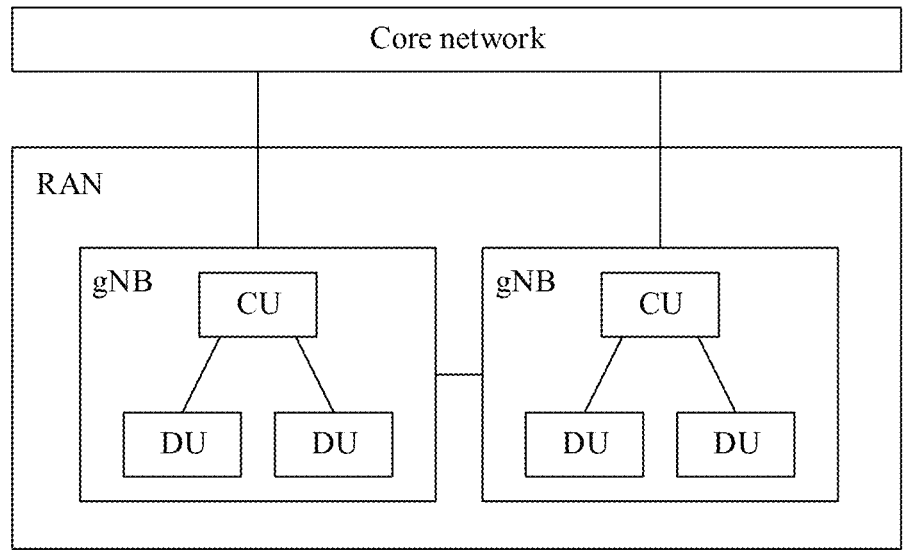
FIG. 2 is one of schematic structural diagrams of an access network device according to an embodiment of this disclosure.

The terminal device may also be referred to as user equipment (user equipment, UE), a mobile station (mobile station, MS), a mobile terminal (mobile terminal, MT), or the like, and is a device that provides voice and/or data connectivity for a user. For example, the terminal device may include a handheld device, a vehicle-mounted device, and the like that has a wireless connection function. Currently, the terminal device may be a mobile phone (mobile phone), a tablet computer, a notebook computer, a palmtop computer, a mobile Internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. In FIG. 2, the terminal device is shown as UE. This is merely used as an example, and poses no limitation on the terminal device.

A radio access network may be the access network (access network, AN) shown in FIG. 1 and provide a wireless access service for the terminal device. The access network device is a device, in the communication system, that enables the terminal device to access a wireless network. The access network device is a node in the radio access network, and may also be referred to as a base station, or may also be referred to as a radio access network (radio access network, RAN) node (or device). Currently, for example, the access network device is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), or a wireless fidelity (wireless fidelity, Wi-Fi) access point (access point, AP).

Figure 3:
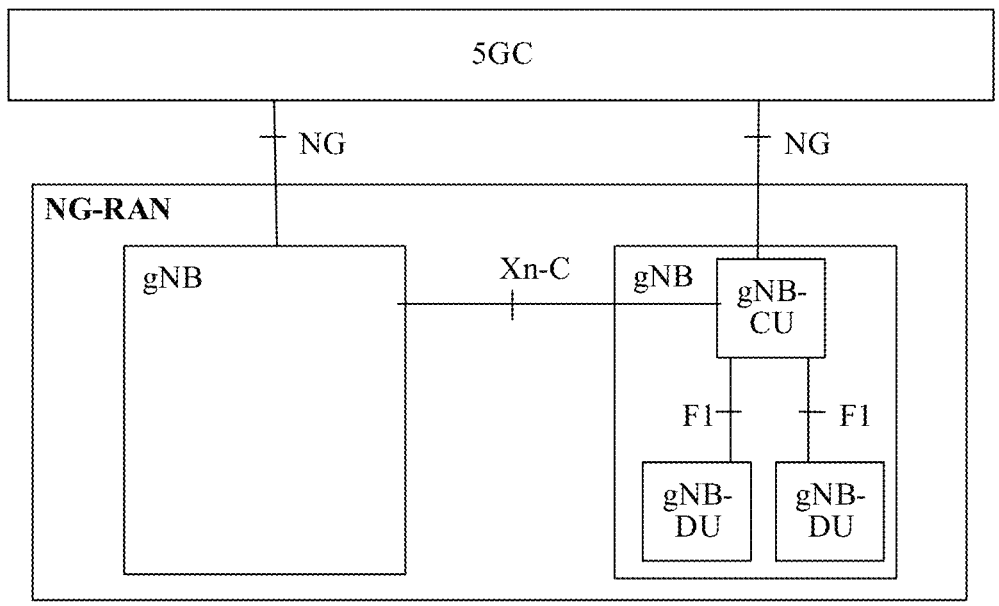
FIG. 3 is one of schematic structural diagrams of an access network device according to an embodiment of this disclosure.

For example, the radio access network device in embodiments of this disclosure may be divided into two parts based on a protocol stack function: a central unit (central unit, CU) and a distributed unit (distributed unit, DU). As shown in FIG. 2, one radio access network device may include one CU and at least one DU. The CU is connected to the at least one DU, and may be configured to manage or control the at least one DU. In this structure, protocol layers of the radio access network device in the communication system may be separated. Some protocol layer functions are implemented in the CU, and functions of some or all of remaining protocol layers are distributed in the DU, and the CU centrally controls the DU. For example, the radio access network device is a gNB. Protocol layers of the gNB include a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in embodiments of this disclosure. As shown in FIG. 3, the CU may be connected to the DU through an F1 interface, the CU is connected to another radio access network device through an Xn interface, and the CU is connected to a 5G core network (5G Core, 5GC) through an NG interface.

Figure 4:
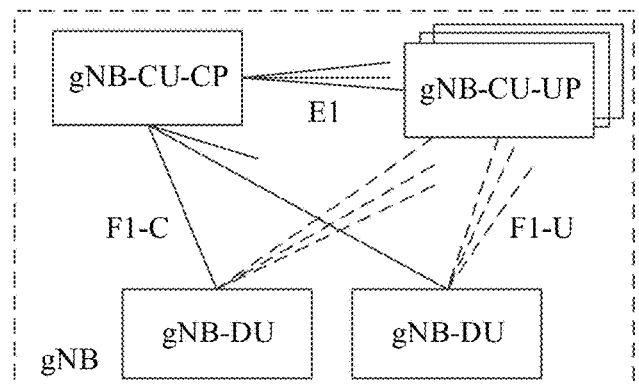
FIG. 4 is one of schematic structural diagrams of an access network device according to an embodiment of this disclosure.

For example, the CU in embodiments of this disclosure may be further divided into one control plane (CU-control plane, CU-CP) network element and at least one user plane (CU-user plane, CU-UP) network element. The CU-CP may be for control plane management, and the CU-UP may be for user plane data transmission. An interface between the CU-CP and the CU-UP may be an E1 interface. An interface between the CU-CP and the DU may be a F1-C, and is for control plane signaling transmission. An interface between the CU-UP and the DU may be a F1-U, and is for user plane data transmission. An interface connecting the CU-UPs may be an Xn-U interface, to perform user plane data transmission. For example, the gNB is used as an example. A structure of the gNB may be shown in FIG. 4.

The data network such as the data network (data network, DN) shown in FIG. 1 may be the Internet (Internet), an IP multimedia service (IP Multimedia Service, IMS) network, a regional network (namely, a local network, such as a mobile edge computing (mobile edge computing, MEC) network), or the like. The data network includes an application server, and the application server provides a service for the terminal device by transmitting data with the terminal device.

The core network is for enabling the terminal device to access the DN that can implement a service of the terminal device. The following describes functions of network elements in the core network.

The access and mobility management function network element may be configured to manage access control and mobility of the terminal device. In a practical application, the network element includes a mobility management function of a mobility management entity (mobility management entity, MME) in a network framework in long term evolution (long term evolution, LTE), and further includes an access management function, and may be specifically responsible for registration, mobility management, tracking area update procedure, reachability detection, selection of a session management function network element, mobility state transition management, and the like of the terminal device. For example, in 5G, the access and mobility management function network element may be an AMF (access and mobility management function) network element, as shown in FIG. 1. In future communication, for example, in 6G, the access and mobility management function network element may still be an AMF network element or have another name. This is not limited in this disclosure. When the access and mobility management function network element is an AMF network element, the AMF may provide a Namf service.

The session management function network element may be configured to be responsible for session management (including session establishment, modification, and release) of the terminal device, selection and reselection of the user plane function network element, internet protocol (internet protocol, IP) address assignment of the terminal device, quality of service (quality of service, QoS) control, and the like. For example, in 5G, the session management function network element may be an SMF (session management function) network element, as shown in FIG. 1. In future communication, for example, in 6G, the session management function network element may still be an SMF network element or have another name. This is not limited in this disclosure. When the session management function network element is an SMF network element, the SMF may provide a Nsmf service.

The policy control function network element may be responsible for policy control decision making, and providing functions such as detection of a service-based data flow and an application, gating, QoS, and flow-based charging control. For example, in 5G, the policy control function network element may be a PCF (policy control function) network element, as shown in FIG. 1. In future communication, for example, in 6G, the policy control function network element may still be a PCF network element or have another name. This is not limited in this disclosure. When the policy control function network element is a PCF network element, the PCF network element may provide an Npcf service.

A main function of the application function network element is to interact with a 3rd generation partnership project (the 3rd generation partnership project, 3GPP) core network to provide a service, to affect service flow routing, access network capability exposure, policy control, and the like. For example, in 5G, the application function network element may be an AF network element, as shown in FIG. 1. In future communication, for example, in 6G, the application function network element may still be an AF network element or have another name. This is not limited in this disclosure. When the application function network element is an AF network element, the AF network element may provide a Naf service.

The data management network element may be configured to manage subscription data of the terminal device, registration information related to the terminal device, and the like. For example, in 5G, the data management network element may be a unified data management network element (unified data management, UDM), as shown in FIG. 1. In future communication, for example, in 6G, the data management network element may still be a UDM network element or have another name. This is not limited in this disclosure. When the data management network element is a UDM network element, the UDM network element may provide a Nudm service.

The network exposure function network element may be configured to enable 3GPP to securely provide a network service capability for a third-party AF (for example, a service capability server (Services Capability Server, SCS) or an application server (Application Server, AS)). For example, in 5G, the network exposure function network element may be an NEF, as shown in FIG. 1. In future communication, for example, in 6G, the network exposure function network element may still be an NEF network element or have another name. This is not limited in this disclosure. When the network exposure function network element is an NEF, the NEF may provide an Nnef service for other network function network elements.

Each of the foregoing network elements in the core network may also be referred to as a functional entity, and may be a network element implemented on dedicated hardware, or may be a software instance running on dedicated hardware, or an instance of a virtualization function on an appropriate platform. For example, the virtualization platform may be a cloud platform.

It should be noted that the communication system architecture shown in FIG. 1 is not limited to including only the network elements shown in the figure, and may further include other devices not shown in the figure. Details are not described herein in this disclosure one by one.

Figure 5:
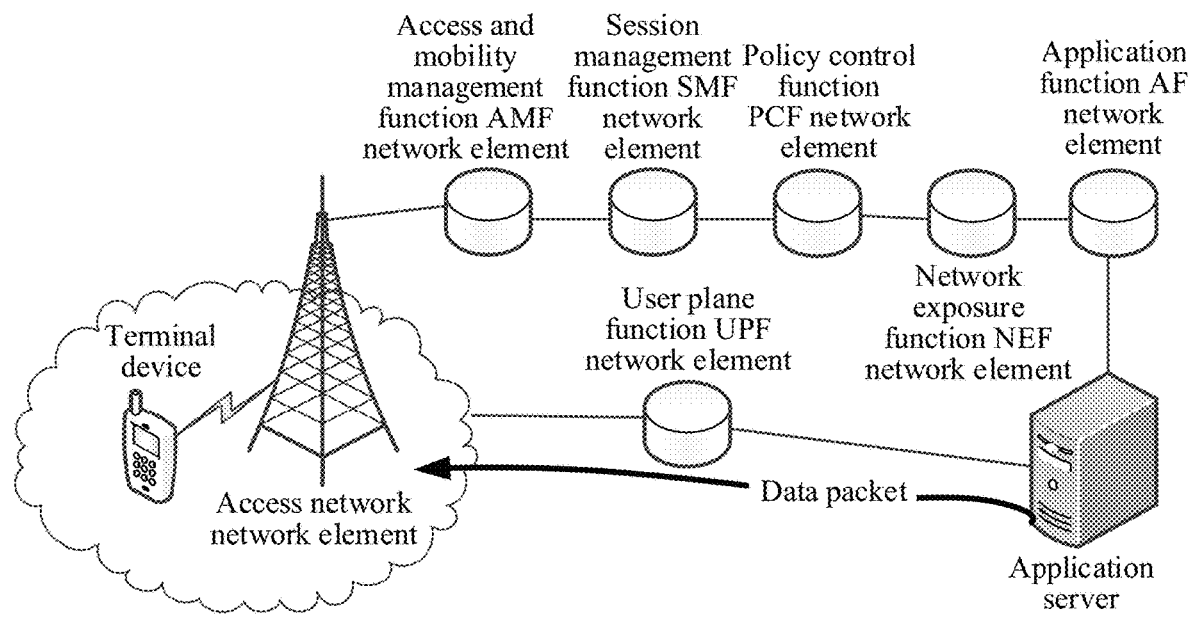
FIG. 5 is a schematic diagram of an application scenario according to an embodiment of this disclosure.

With the rapid development of the new media industry, a sharp increase of data volume in the media industry poses a challenge to a network transmission capability. In particular, emerging media streams such as ultra high-definition videos and VR panoramic videos, have higher requirements on a data delay. As shown in FIG. 5, a current data transmission method is implemented by using the TCP protocol. An AS server sends data to a UPF, the UPF sends the data to a RAN, and then the RAN sends the data to UE1 for display. It is assumed that the UE1 can feed back a receiving response to the received data, where the receiving response may represent a TCP sequence number of a received data packet. For example, if the UE1 receives the data packets 1, 2, 3, and 4 sent by the AS, the UE1 may directly return 3 in the receiving response to indicate the largest TCP sequence number in the received data, or may return 1, 2, and 3 in the receiving response to indicate all TCP sequence numbers in the received data. However, the TCP protocol has in-sequence delivery, in other words, when data is sent, there is a corresponding TCP sequence number. Once a piece of data is lost and retransmitted, even if subsequent data reaches a TCP layer of a receiving end, subsequent data is not uploaded to the AS server until a subsequent retransmitted data packet arrives. Therefore, a client (for example, UE 1) waits during data transmission, and frame freezing during play is caused at a media service layer.

Figure 6:
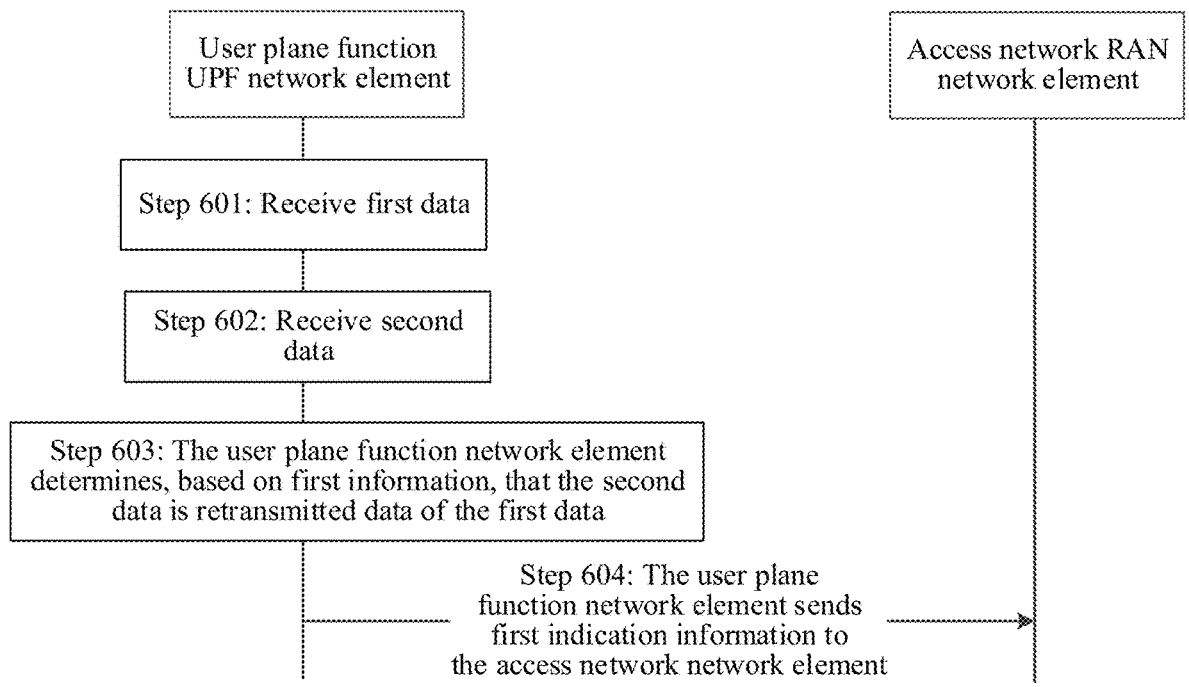
FIG. 6 is one of example flowcharts of a communication method according to an embodiment of this disclosure.

Based on the foregoing requirements, an embodiment of this disclosure provides a communication method that may optimize network transmission quality, and avoid an extra delay caused by retransmission. It should be understood that this embodiment of this disclosure is not only applicable to a communication system in which data is transmitted through the TCP protocol, but also applicable to a communication system with in-sequence delivery and retransmission reliability. FIG. 6 is an example flowchart of a communication method shown from a perspective of device interaction, and may include the following steps.

Step 601: A user plane function network element receives first data and sends the first data to an access network network element.

The user plane function network element may receive the first data from an application server, and the first data may be sent from the application server to the user plane function network element.

Step 602: The user plane function network element receives second data and sends the second data to the access network network element.

Similarly, the user plane function network element may receive the second data from the application server, and the second data may be sent from the application server to the user plane function network element.

Step 603: The user plane function network element determines, based on first information, that the second data is retransmitted data of the first data.

The first information herein may be information used by the user plane function network element to determine whether the second data is the retransmitted data of the first data or out-of-order data. The following separately describes different cases of the first information.

Case 1: The first information includes a data packet sequence number difference threshold.

The first information may be received from the application server. The data packet sequence number difference threshold herein may be set based on an empirical value. This is not specifically limited in this disclosure.

In an example, the user plane function network element may determine, based on a difference between a data packet sequence number of the second data and a data packet sequence number of adjacent data, and the data packet sequence number difference threshold, whether the difference is greater than or equal to the data packet sequence number difference threshold. If the difference is greater than or equal to the data packet sequence number difference threshold, the user plane function network element may determine that the second data is the retransmitted data of the first data; or if the difference is not greater than or equal to the data packet sequence number difference threshold, the user plane function network element may determine that the second data is not the retransmitted data of the first data.

In another example, the user plane function network element may determine, based on a difference between a data packet sequence number of the second data and a data packet sequence number of adjacent data, and the data packet sequence number difference threshold, whether the second data is out-of-order data. For example, if the difference between the data packet sequence number of the second data and the data packet sequence number of the adjacent data is greater than or equal to the data packet sequence number difference threshold, the second data is out-of-order data. The out-of-order data may be data whose data packet sequence number is far greater than or far less than a data packet sequence number of adjacent data. For example, the user plane function network element separately receives data packets with sequence numbers 2, 18, and 3. It can be learned that the sequence number 18 of the data packet is far greater than the sequence numbers 2 and 3 of the adjacent data. Therefore, it may be considered that the data of the data packet sequence number 18 is out-of-order data.

Case 2: The first information includes a receiving response to the first data.

The first information herein may be received from the access network network element. After the user plane function network element sends the first data to the access network network element, if the access network network element receives the first data, the access network network element may send the receiving response to the first data to the user plane function network element. The user plane function network element may record the receiving response and the first data corresponding to the receiving response.

In an example, the user plane function network element may record a data packet sequence number of the sent first data and a data packet sequence number of the first data corresponding to the received receiving response. The user plane function network element may determine, based on the record, whether the receiving response to the first data is received.

In another example, the user plane function network element may record data packet sequence numbers of the sent first data. If the user plane function network element receives the receiving response to the first data, the user plane function network element may determine the data packet sequence number of the first data corresponding to the receiving response, and delete the data packet sequence number from the recorded data packet sequence numbers. The user plane function network element may determine, based on remaining data packet sequence numbers in the record, which first data whose receiving responses are not received.

The user plane function network element may identify, based on the receiving response to the first data, whether the second data is the retransmitted data of the first data. For example, if a data packet sequence number of the second data received by the user plane function network element is the same as the data packet sequence number of the first data, and the first information does not include the receiving response to the first data, the user plane function network element may determine that the second data is the retransmitted data to the first data.

For example, the user plane function network element receives first data with data packet sequence numbers 1, 2, and 3. The user plane function network element may separately send the first data with data packet sequence numbers 1, 2, and 3 to the access network network element. After receiving the foregoing three pieces of first data, a terminal user may send receiving responses to the first data to the user plane function network element. The user plane function network element receives, from the access network network element, receiving responses to the first data with data packet sequence numbers 1 and 3. The user plane function network element then receives second data with a data packet sequence number 2, but the first information does not include a receiving response to the first data with the data packet sequence number 2. Therefore, the user plane function network element may determine that the second data with the data packet sequence number 2 is retransmitted data of the first data with the data packet sequence number 2.

Step 604: The user plane function network element may send first indication information to the access network network element.

The first indication information herein may indicate that the second data is the retransmitted data, or indicate a sending priority of the second data. For example, when determining that the second data is the retransmitted data, the user plane function network element may send, to the access network network element, the first indication information indicating that the second data is the retransmitted data, or send, to the access network network element, the first indication information indicating that the sending priority of the second data is highest. For example, the first indication information herein may be an identifier, and the identifier may indicate that the second data is the retransmitted data, or indicate the sending priority of the second data.

Optionally, the first indication information may indicate that the second data is out-of-order data. In addition, the first indication information may further indicate that, when the second data is out-of-order data, the data packet sequence number of the second data is less than that of adjacent data, or when the second data is out-of-order data, the data packet sequence number of the second data is greater than that of the adjacent data. In this case, if the data packet sequence number of the second data is less than that of the adjacent data, the second data needs to be preferentially sent; or if the data packet sequence number of the second data is greater than that of the adjacent data, the first data needs to be preferentially sent.

In an example, the sending priority of the second data may be indicated through QoS flow identification information. For example, the first indication information may be identification information of a first QoS flow. In this case, the first data may be sent through a second QoS flow, and the second data may be sent through the first QoS flow. A priority of the first QoS flow herein is higher than that of the second QoS flow. The user plane function network element may send the first indication information to the access network network element, to indicate that a QoS flow of the second data is the first QoS flow. When receiving the identification information of the first QoS flow as the first indication information, the access network network element may send the second data through the first QoS flow, and send the first data through the second QoS flow. Specifically, the access network network element maps data of different QoS flows to corresponding data radio bearers (Data Radio Bearers, DRBs) and sends the data to a user side.

In addition, it should be noted that the first QoS flow and the second QoS flow herein are generated by a policy control function network element. The policy control function network element may receive second indication information from the application server. The policy control function network element may generate, based on the second indication information, the first QoS flow and the second QoS flow with different priorities. The priority of the first QoS flow may be higher than that of the second QoS flow. It should be understood that the policy control function network element may generate two QoS flows, three QoS flows, or a plurality of QoS flows. This is not specifically limited in this disclosure. A plurality of QoS flows generated by the policy control function network element have different priorities.

In this embodiment of this disclosure, the user plane function network element may include the first indication information in a GPRS tunneling protocol (GPRS Tunneling Protocol, GTP) layer, which is specifically a GTP-U layer, of a data packet of the second data. The GTP layer is a layer that can be identified by the access network network element. Therefore, the access network network element may identify the first indication information at the GTP layer.

Optionally, in this embodiment of this disclosure, the access network network element may determine the sending priority of the second data based on the first indication information.

The access network network element may determine, based on the indication information, that the sending priority of the second data is higher than that of the first data. In this case, the access network network element may perform priority scheduling, and preferentially transmit the second data. Alternatively, the access network network element may determine, based on the indication information, that the sending priority of the second data is lower than that of the first data. In this case, the access network network element may perform priority scheduling, and preferentially transmit the first data.

For example, when the first indication information indicates that the second data is the retransmitted data of the first data, the access network network element may determine that the sending priority of the second data is higher than that of the first data, and the access network network element may perform priority scheduling, and preferentially transmit the second data.

In an example, the access network network element may determine, based on the first indication information, that the second data is out-of-order data. In this case, the access network network element may determine the sending priority of the second data based on the first indication information. For example, the first indication information may indicate that the second data is out-of-order data, and that the data packet sequence number of the second data is less than that of the adjacent data. In this case, the access network network element may determine that the sending priority of the second data is higher than that of the first data. For another example, the first indication information may indicate that the second data is out-of-order data, and that the data packet sequence number of the second data is greater than that of the adjacent data. In this case, the access network network element may determine that the sending priority of the second data is lower than that of the first data.

In addition, it should be noted that the access network network element may receive second information from a session management function network element, and the second information includes the first indication information. Therefore, when the access network network element determines that the first indication information from the session management function network element is the same as the first indication information from the user plane function network element, the second data is considered as the retransmitted data or out-of-order data. In this case, the access network network element may perform priority scheduling based on the first indication information.

Figure 7:
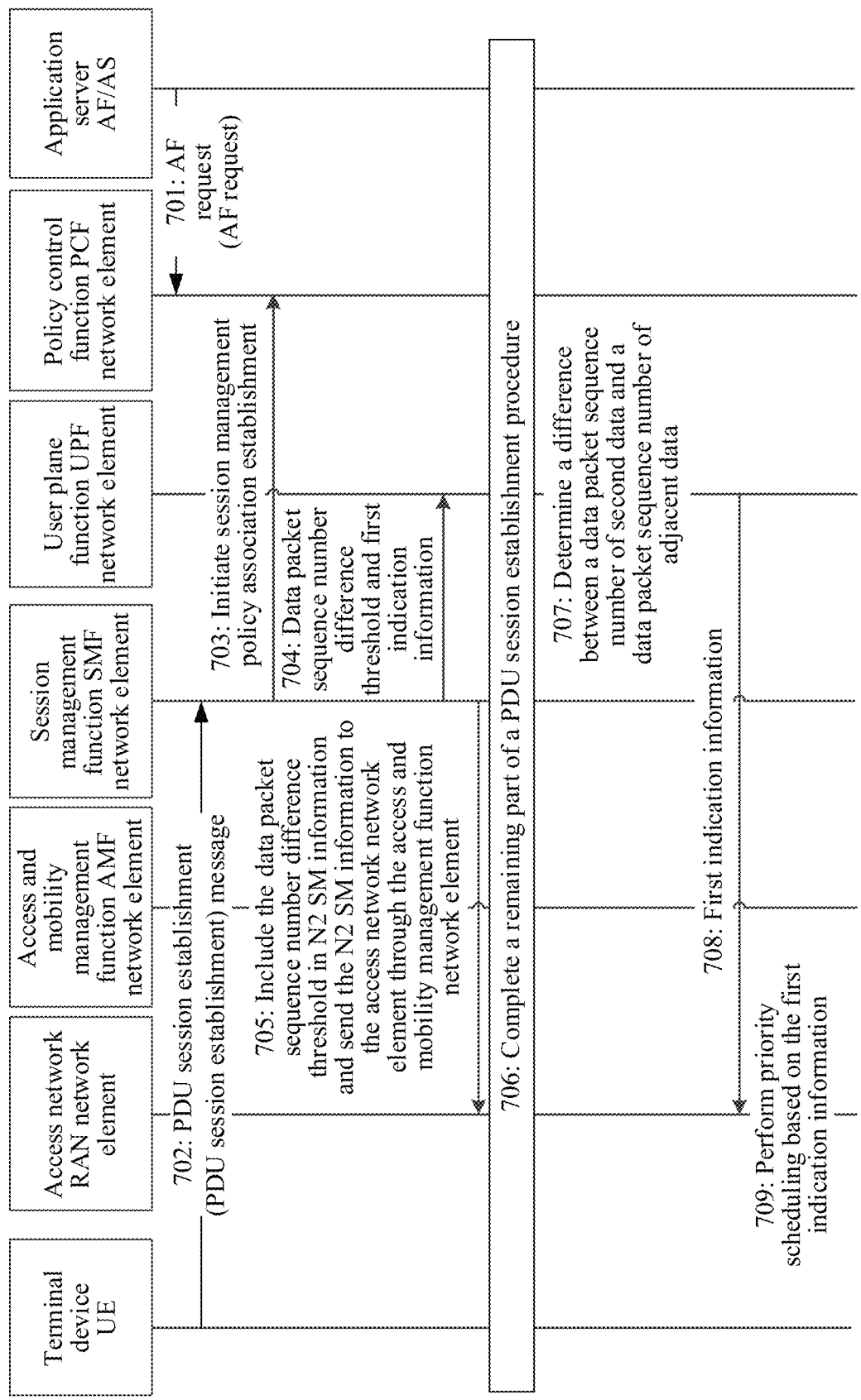
FIG. 7 is one of example flowcharts of a communication method according to an embodiment of this disclosure.

The following describes, with reference to FIG. 7, a method for transmitting first data and second data when first information includes a data packet difference threshold. FIG. 7 is an example flowchart of a communication method shown from a perspective of device interaction, and may include the following steps.

Step 701: An application server sends indication information to a policy control function network element.

For example, the application server sends the indication information to the policy control function network element through an AF request (AF request) message. Optionally, the AF request message may further include a data packet sequence number difference threshold. In this case, the data packet sequence number may be a TCP sequence number, and the data packet sequence number difference threshold may be a TCP sequence number difference threshold. The indication information may include flow description information, and is used by the policy control function network element to determine that priority scheduling needs to be performed on a service corresponding to the flow description information.

Step 702: A terminal device initiates a protocol data unit (protocol data unit, PDU) session establishment procedure, and the terminal device sends a PDU session establishment message to a session management function network element.

Optionally, if the terminal device has established a PDU session with the session management function network element, the terminal device may send a PDU Session Modification Request message to the session management function network element in step 701 to initiate a PDU session modification procedure.

Specifically, the UE sends a PDU session establishment/modification request message to an access and mobility management network element, and after selecting the session management function network element, the access and mobility management function network element sends session-related information from the UE to the session management function network element through a Nsmf_PDUSession_CreateSMContext/UpdateSMContext service.

Step 703: The session management function network element initiates session management policy association establishment to the policy control function network element.

Optionally, if the procedure initiated by the terminal device in step 702 is a PDU session modification procedure, in step 703, the session management function network element may initiate a session management policy association modification procedure to the policy control function network element.

Optionally, in a session management policy association establishment/modification procedure, the policy control function network element sends the difference threshold and first indication information to the session management function network element.

Step 704: The session management function network element sends the data packet sequence number difference threshold and the first indication information to the user plane function network element.

The first indication information herein may be indication information indicating that the second data is retransmitted data of the first data, or may be indication information indicating a sending priority of the second data.

Step 705: The session management function network element includes the first indication information in N2 SM information and sends the N2 SM information to an access network network element through the access and mobility management function network element.

Specifically, the session management function network element sends the N2 SM information to a mobility management function network element side through a Namf_Communication_N1N2MessageTransfer service, and a mobility management function network element notifies an access network network element side in an N2 PDU Session procedure. Optionally, the session management function network element may alternatively include second indication information in the N2 SM information.

Step 706: Complete a remaining part of the PDU session establishment procedure.

Alternatively, the PDU session modification procedure may be completed in step 706.

Step 707: The user plane function network element determines a difference between a data packet sequence number of the second data and a data packet sequence number of adjacent data.

If the user plane function network element determines that the difference between the data packet sequence number of the second data and the data packet sequence number of the adjacent data exceeds the data packet sequence number difference threshold, the second data may be considered as the retransmitted data or out-of-order data.

Step 708: The user plane function network element sends a retransmitted data packet or an out-of-order data packet that includes the first indication information to the access network network element.

The user plane function network element may include the first indication information in a GTP layer of a data packet of the second data, and send the data packet to the access network network element. The first indication information herein may indicate that the second data is the retransmitted data or out-of-order data, or indicate the priority of the second data.

Step 709: The access network network element performs priority scheduling based on the first indication information.

For a specific manner in which the access network network element performs priority scheduling based on the first indication information, refer to the descriptions in the method embodiment shown in FIG. 6. Details are not described herein again.

Figure 8:
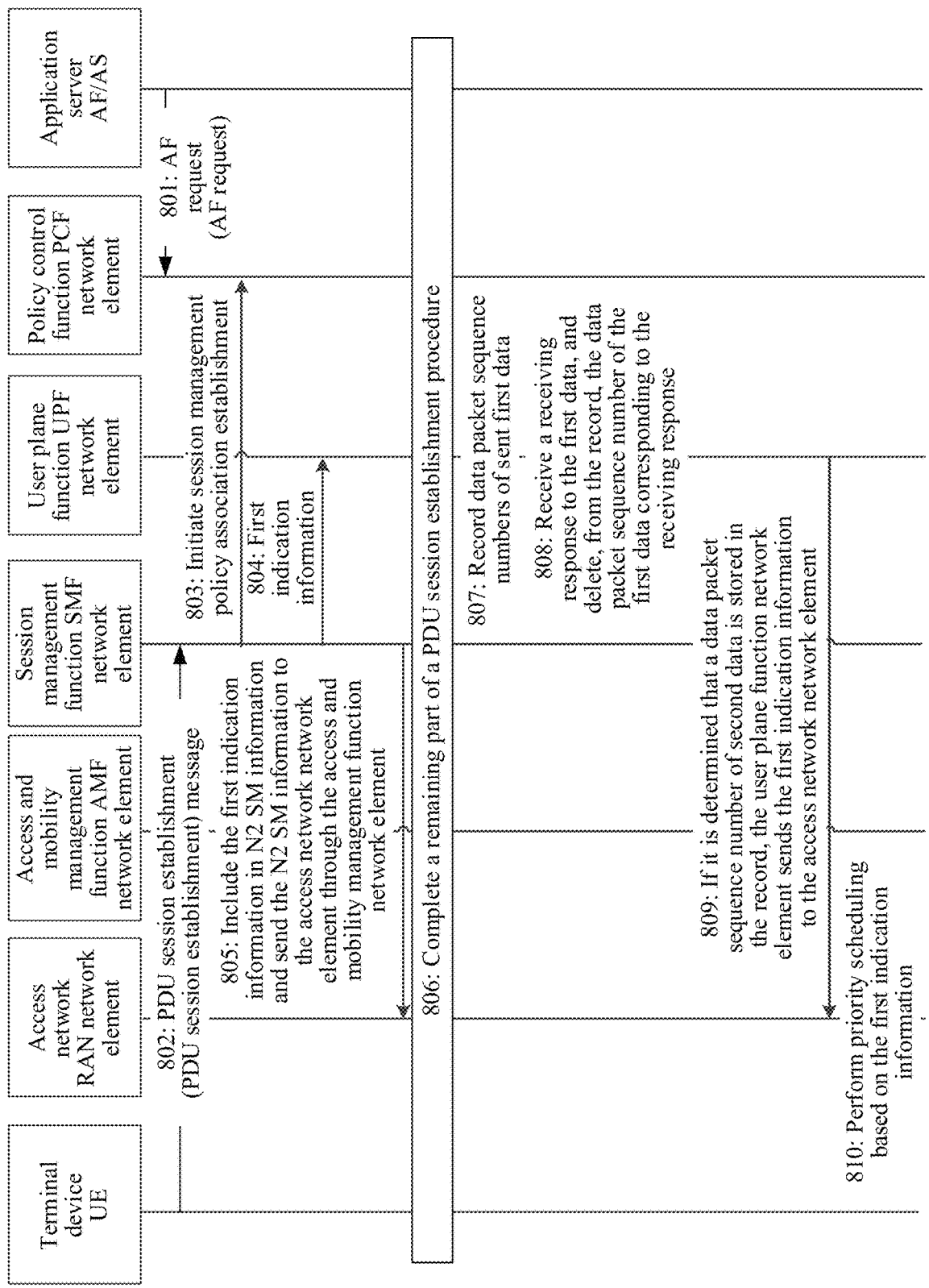
FIG. 8 is one of example flowcharts of a communication method according to an embodiment of this disclosure.

The following describes, with reference to FIG. 8, a method for transmitting first data and second data when first information includes a receiving response to the first data.

FIG. 8 is an example flowchart of a communication method shown from a perspective of device interaction, and may include the following steps.

Step 801: An application server sends first indication information to a policy control function network element through an AF request message.

Optionally, the indication information may include flow description information, and is used by the policy control function network element to determine that priority scheduling needs to be performed on a service corresponding to the flow description information.

Step 802: A terminal device initiates a PDU session establishment procedure, and the terminal device sends a PDU session establishment message to a session management function network element.

Optionally, if the terminal device has established a PDU session with the session management function network element, the terminal device may send a PDU Session Modification Request message to the session management function network element in step 801 to initiate a PDU session modification procedure.

Specifically, the UE sends a PDU session establishment/modification request message to an access and mobility management network element, and after selecting the session management function network element, the access and mobility management function network element sends session-related information from the UE to the session management function network element through a Nsmf_PDUSession_CreateSMContext/UpdateSMContext service.

Step 803: The session management function network element initiates session management policy association establishment to the policy control function network element.

Optionally, if the procedure initiated by the terminal device in step 802 is a PDU session modification procedure, in step 803, the session management function network element may initiate a session management policy association modification procedure to the policy control function network element.

Optionally, in a session management policy association establishment/modification procedure, the policy control function network element sends the first indication information to the session management function network element.

Step 804: The session management function network element sends first indication information to the user plane function network element.

The first indication information herein may be indication information indicating that the second data is retransmitted data of the first data, or may be indication information indicating a sending priority of the second data.

Step 805: The session management function network element includes the first indication information in N2 SM information and sends the N2 SM information to an access network network element through the access and mobility management function network element.

Specifically, the session management function network element sends the N2 SM information to a mobility management function network element side through a Namf_Communication_N1N2MessageTransfer service, and a mobility management function network element notifies an access network network element side in an N2 PDU Session procedure. Optionally, the session management function network element may alternatively include second indication information in the N2 SM information.

Step 806: Complete a remaining part of the PDU session establishment procedure.

Alternatively, the PDU session modification procedure may be completed in step 806.

Step 807: The user plane function network element records data packet sequence numbers of the first data sent by the application server.

Step 808: The user plane function network element receives a receiving response to the first data, and deletes, from the record, the data packet sequence number of the first data corresponding to the receiving response.

Optionally, the user plane function network element may detect an acknowledgment character (acknowledge character, ACK) sequence number of a data packet header included in uplink data. Specifically, the TCP protocol is used as an example, and a TCP header message includes the ACK sequence number. The ACK sequence number may indicate that a data packet of the sent first data has been received.

Step 809: If the user plane function network element determines that a data packet sequence number of the second data has been stored in the record, the user plane function network element sends, to the access network network element, the second data that includes the first indication information.

Optionally, the user plane function network element may include the first indication information in a GTP layer of a data packet of the second data, and send the data packet to the access network network element.

Step 810: The access network network element performs priority scheduling based on the first indication information.

For a specific manner in which the access network network element performs priority scheduling based on the first indication information, refer to the descriptions in the method embodiment shown in FIG. 6. Details are not described herein again.

Figure 9A:
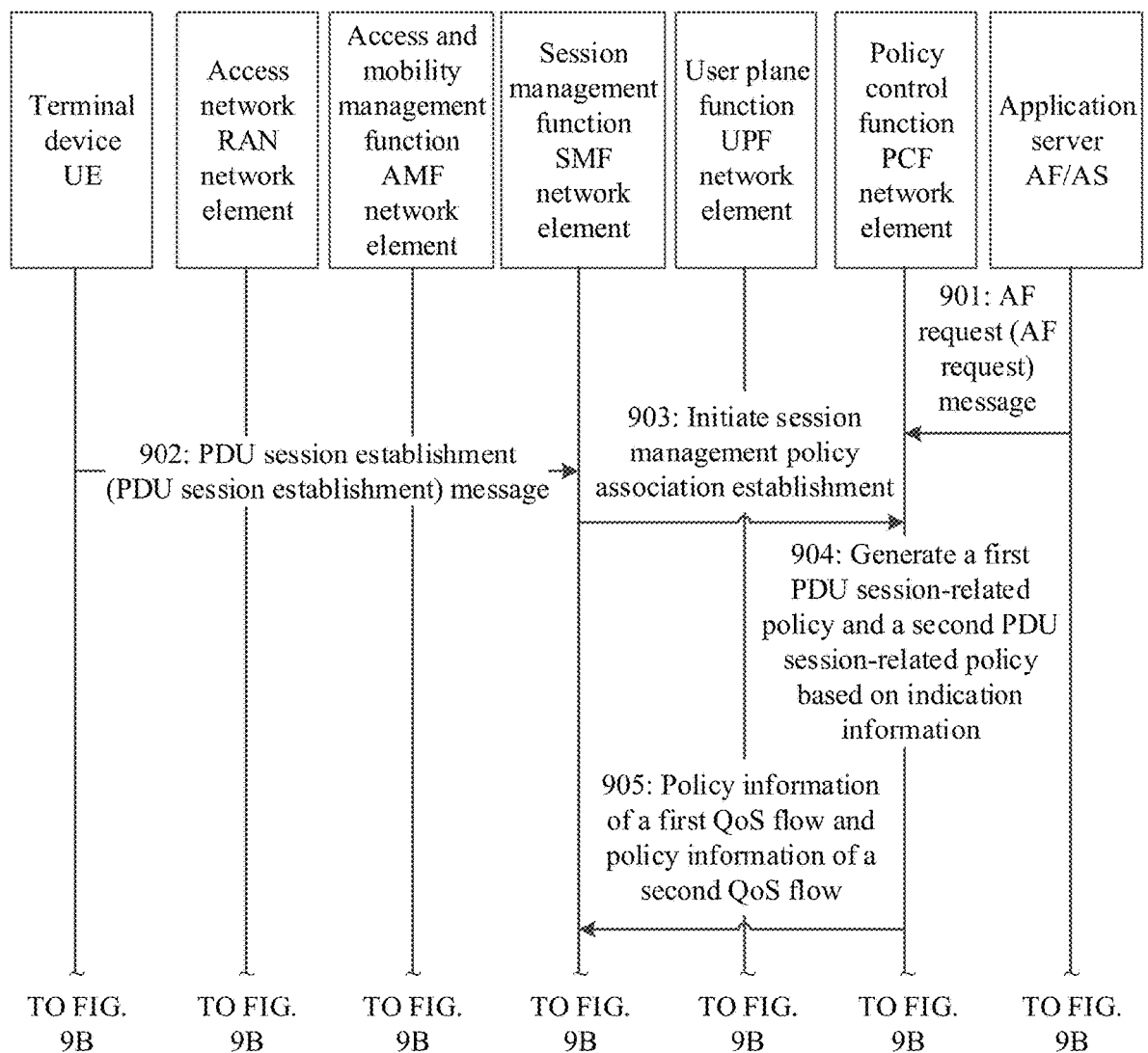
FIG. 9A and FIG. 9B are one of example flowcharts of a communication method according to an embodiment of this disclosure.
Figure 9B:
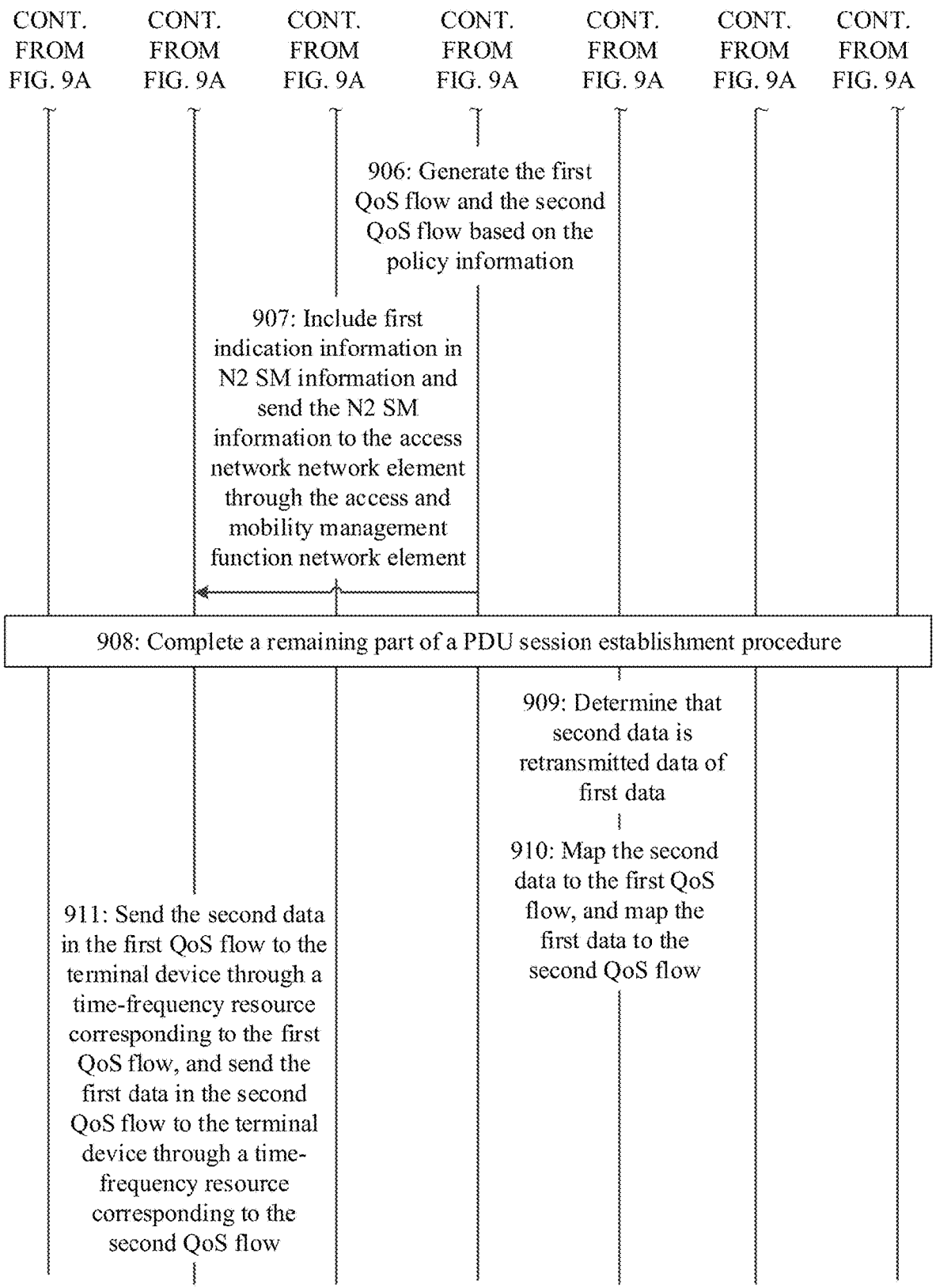

The following describes, with reference to FIG. 9A and FIG. 9B, a method for transmitting first data and second data through QoS flows with different priorities. FIG. 9A and FIG. 9B are an example flowchart of a communication method shown from a perspective of device interaction, and may include the following steps.

Step 901: An application server sends indication information to a policy control function network element through an AF request message.

An AF may send the information to the PCF through an NEF and the AF sends the information to the NEF through an Nnef_ServiceParameter_Create/Update service. Then, the NEF stores, updates, or deletes content in a UDR to trigger an Nudr_DM_Notify service. In this way, the PCF is notified, and interaction between the AF and the PCF is completed.

Optionally, the AF request message herein may further include a data packet sequence number difference threshold. A data packet sequence number may be a TCP sequence number, and the data packet sequence number difference threshold may be a TCP sequence number difference threshold. The indication information may be used to trigger the policy control function network element to generate QoS flows of different priorities. The AF request message may further include flow description information, and the flow description information herein may be used by the policy control function network element to determine a specific service of the QoS flow that needs to be generated.

Step 902: A terminal device initiates a PDU session establishment procedure, and the terminal device sends a PDU session establishment message to a session management function network element.

Optionally, if the terminal device has established a PDU session, the terminal device may send a PDU Session Modification Request message to the session management function network element in step 902 to initiate a PDU session modification procedure.

Specifically, the UE sends a PDU session establishment/modification request message to an access and mobility management network element, and after selecting the session management function network element, the access and mobility management function network element sends session-related information from the UE to the session management function network element through a Nsmf_PDUSession_CreateSMContext/UpdateSMContext service.

Step 903: The session management function network element initiates session management policy association establishment to the policy control function network element.

Optionally, if the procedure initiated by the terminal device in step 902 is the PDU session modification procedure, in step 903, the session management function network element may initiate a session management policy association modification procedure to the policy control function network element.

Step 904: The policy control function network element generates, based on the indication information, a first PDU session-related policy corresponding to a first QoS flow and a second PDU session-related policy corresponding to a second QoS flow.

A priority of the first QoS flow herein may be higher than that of the second QoS flow.

Step 905: The policy control function network element sends policy information of the first QoS flow and policy information of the second QoS flow to the session management function network element.

The policy information may indicate that the priority of the first QoS flow is higher than that of the second QoS flow. Optionally, the policy control function network element may send the first PDU session-related policy, the second PDU session-related policy, and the data packet sequence number difference threshold to the session management function network element.

Step 906: The session management function network element generates related information of the first QoS flow and the second QoS flow based on the policy information, where the related information includes a specific QoS parameter and a QoS flow identifier QFI.

Step 907 and step 908 may be the same as step 704 and step 705 shown in FIG. 7, or step 907 and step 908 may be the same as step 804 and step 805 shown in FIG. 8.

Step 909: The user plane function network element determines that the second data is retransmitted data of the first data.

In step 909, the user plane function network element may determine, based on step 705 shown in FIG. 7 or step 805 to step 807 shown in FIG. 8, that the second data is the retransmitted data of the first data.

Step 910: The user plane function network element maps the second data to the first QoS flow, and maps the first data to the second QoS flow.

Step 911: The access network network element sends the second data in the first QoS flow to the terminal device through a data radio bearer (Data Radio Bearer, DRB) corresponding to the first QoS flow, and sends the first data in the second QoS flow to the terminal device through a DRB corresponding to the second QoS flow.

Figure 10:
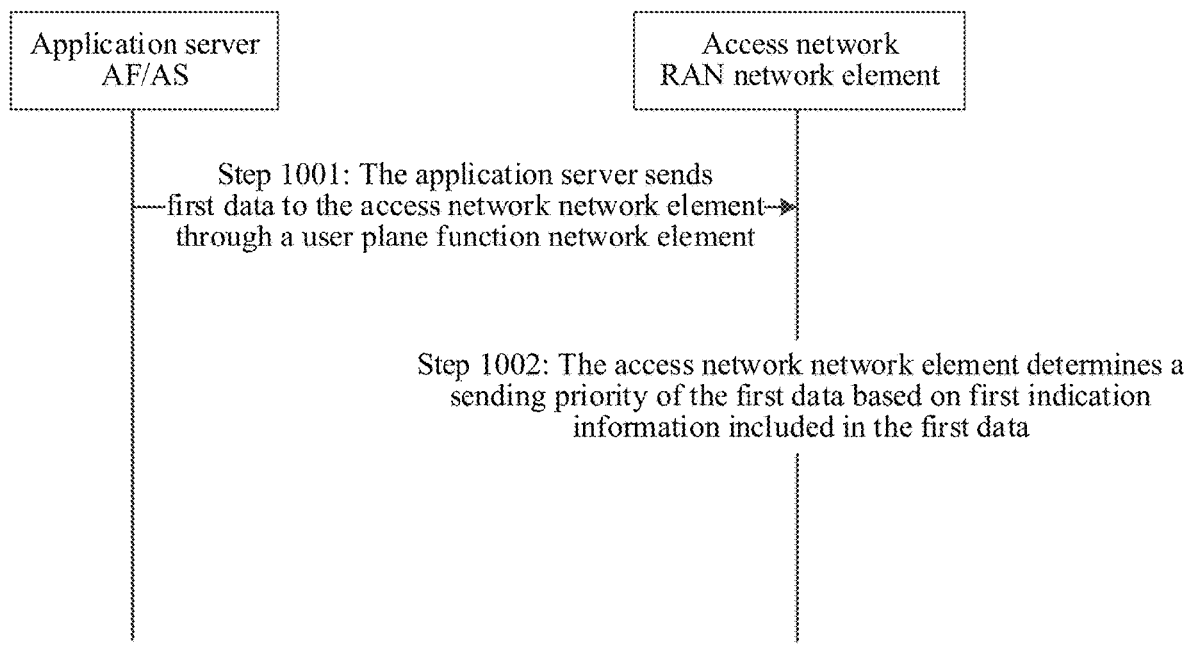
FIG. 10 is one of example flowcharts of a communication method according to an embodiment of this disclosure.

This embodiment of this disclosure further provides another communication method. FIG. 10 is an example flowchart of a communication method shown from a perspective of device interaction, and may include the following steps.

Step 1001: An application server sends first data to an access network network element through a user plane function network element.

The first data herein includes first indication information, and the first indication information may indicate a sending sequence of data packets of the first data at an application server end. The first indication information may be a data packet sequence number, or may be identification information for identifying a data packet sequence number. For example, the first indication information may be a TCP sequence number, or may be identification information that identifies a data sending sequence of the application server.

Optionally, the user plane function network element may add the first indication information to a GTP layer of the first data and send the first data to the access network network element. Alternatively, the user plane function network element may map the first indication information to new indication information and add the new indication information to a GTP layer of the first data.

Step 1002: The access network network element determines a sending priority of the first data based on the first indication information or the new indication information included in the first data.

The access network network element may determine the priority of the first data based on the sending sequence of the data packets of the first data at the application server end. For example, first data sent by the application server side first has a higher priority, and first data sent later has a lower priority.

In an example, the priority of the first data may be determined based on the data packet sequence number identified by the first indication information, and a smaller data packet sequence number indicates a higher priority of the first data. Therefore, the access network network element may send the first data in ascending order of data packet sequence numbers. High-priority processing may be performed on data whose data packet sequence number is far less than a data packet sequence number of adjacent data, and low-priority processing may be performed on data whose data packet sequence number is far greater than a data packet sequence number of adjacent data.

For example, the access network network element separately receives first data with data packet sequence numbers 2, 3, 4, 19, 22, 6, and 8, and the access network network element may preferentially send the first data with the data packet sequence numbers 2, 3, 4, 6, and 8. However, the first data with the data packet sequence numbers 19 and 22 herein is out-of-order data, and the data packet sequence numbers are far less than the data packet sequence numbers of the adjacent data. Therefore, sending of such data may be delayed.

In addition, it should be noted that the access network network element may receive second indication information from a session management function network element. The second indication information herein may indicate the access network network element to transmit data based on transmission priority information. After receiving the second indication information, the access network network element may perform priority scheduling based on the first indication information.

Figure 11:
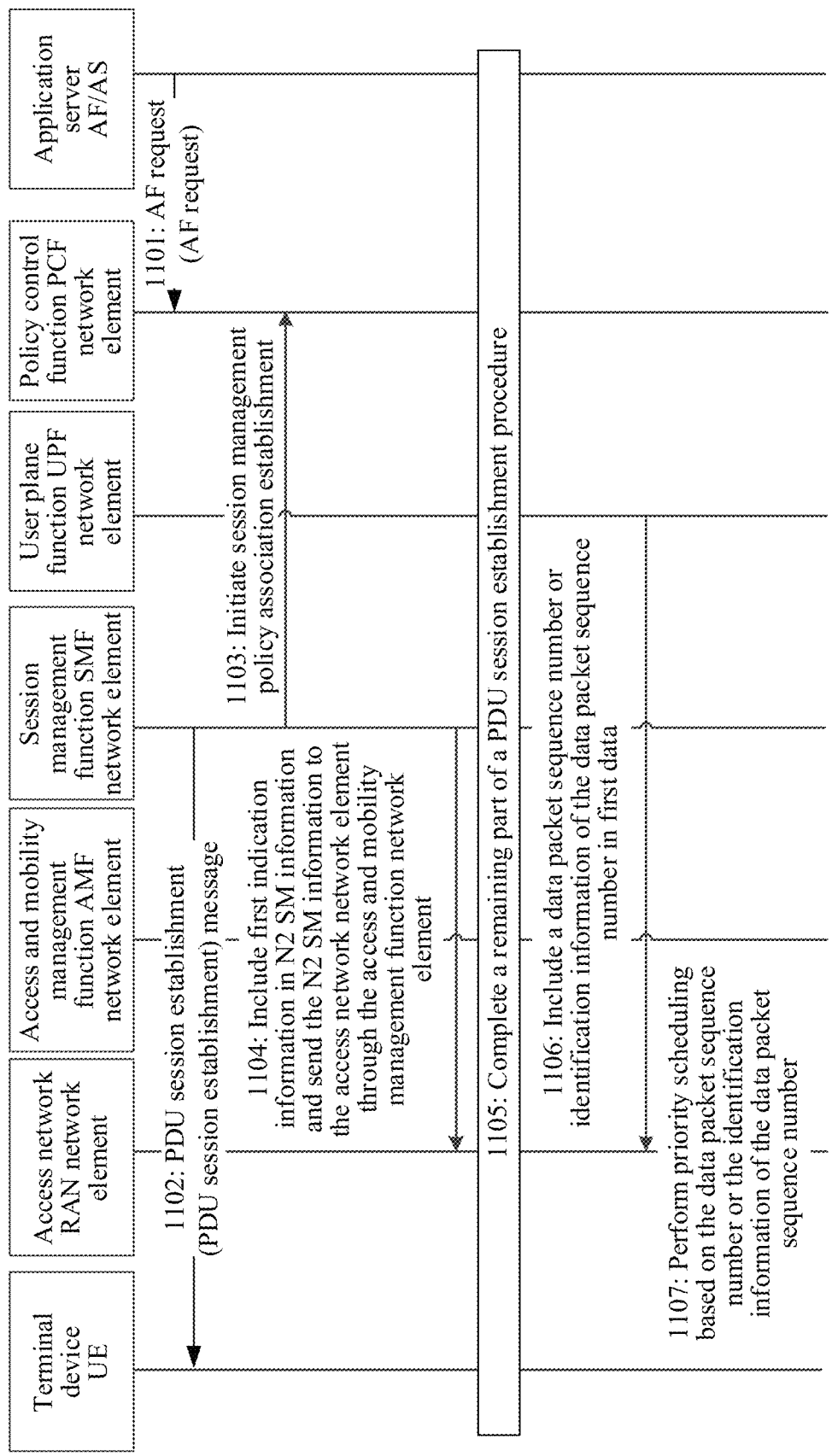
FIG. 11 is one of example flowcharts of a communication method according to an embodiment of this disclosure.

The following describes, with reference to FIG. 11, a data transmission method when first indication information indicates a sending sequence of data packets of first data at an application server end. FIG. 11 is an example flowchart of a communication method shown from a perspective of device interaction, and may include the following steps.

Step 1101: An application server sends indication information to a policy control function network element through an AF request message.

Optionally, the AF request message herein may further include identification information of a data packet sequence number. The identification information may be an identifier of the data packet sequence number, or may be a mapping of the identifier of the data packet sequence number. The indication information may include flow description information, and is used by the policy control function network element to determine that priority scheduling needs to be performed on a service corresponding to the flow description information.

Step 1102: A terminal device initiates a PDU session establishment procedure, and the terminal device sends a PDU session establishment message to a session management function network element.

Optionally, if the terminal device has established a PDU session with the session management function network element, the terminal device may send a modification request message to the session management function network element in step 1101 to initiate a PDU session modification procedure.

Step 1103: The session management function network element initiates session management policy association establishment to the policy control function network element.

Optionally, if the procedure initiated by the terminal device in step 1101 is a PDU session modification procedure, in step 1102, the session management function network element may initiate a session management policy modification procedure to the policy control function network element.

Step 1104: The session management function network element sends second indication information to an access network network element through an access and mobility management function network element.

The second indication information herein may indicate the access network network element to transmit data based on priority information. Optionally, the session management function network element may send the identification information of the data packet sequence number to the access network network element and a user plane function network element, so that the user plane function network element and the access network network element may transmit first data based on the identification information.

Step 1105: Complete a remaining part of the PDU session establishment procedure.

Alternatively, the PDU session modification procedure may be completed in step 1104.

Step 1106: The user plane function network element includes the data packet sequence number or the identification information of the data packet sequence number in the first data, and sends the first data to the access network network element.

In this case, the user plane function network element may include the data packet sequence number or the identification information of the data packet sequence number in a GTP layer of the first data, and send the first data to the access network network element.

Step 1107: The access network network element performs priority scheduling based on the data packet sequence number or the identification information of the data packet sequence number.

The access network network element may send the first data in ascending order of data packet sequence numbers or in ascending order of data packet sequence numbers identified by the identification information. If a data packet sequence number of one piece of first data is less than a data packet sequence number of adjacent data, and a difference between the two exceeds a preset difference threshold, high-priority processing may be performed on the first data, in other words, the first data may be sent preferentially. If a data packet sequence number of one piece of first data is greater than a data packet sequence number of adjacent data, and a difference between the two exceeds a preset difference threshold, low-priority processing may be performed on the first data, in other words, sending of the first data may be delayed.

Based on a same technical concept as the foregoing communication method, as shown in FIG. 10, an apparatus 1200 with a communication function is provided. The apparatus 1200 can perform steps performed by the user plane function network element, the access network network element, the policy control function network element, or the application server in the foregoing methods. To avoid repetition, details are not described herein again. The apparatus 1200 includes: a communication unit 1210, a processing unit 1220, and optionally, further includes a storage unit 1230. The processing unit 1220 may be connected to the storage unit 1230 and the communication unit 1210, and the storage unit 1230 may also be connected to the communication unit 1210. The processing unit 1220 may be integrated with the storage unit 1230.

The storage unit 1230 is configured to store a computer program.

For example, when the apparatus 1200 performs the steps performed by the user plane function network element, the communication unit 1210 is configured to receive first data; and the communication unit 1210 is further configured to receive second data. The processing unit 1220 is configured to determine, based on first information, that the second data is retransmitted data of the first data. The communication unit 1210 is further configured to send first indication information to the access network network element. For descriptions of the first data, the second data, and the first indication information, refer to related descriptions in the method embodiments shown in FIG. 6 to FIG. 11.

In a design, the communication unit 1210 is further configured to receive the first information from the application server, where the first information includes a data packet sequence number difference threshold.

In a design, the processing unit 1220 is specifically configured to determine that a difference between a data packet sequence number of the second data and a data packet sequence number of adjacent data exceeds the data packet sequence number difference threshold.

In a design, the communication unit is further configured to receive the first information from the access network network element, where the first information indicates a receiving response to the first data.

In a design, when determining, based on the first information, that the second information is the retransmitted data of the first data, the processing unit 1220 is specifically configured to: determine that the first information does not include the receiving response to the first data.

For example, when the apparatus 1200 performs the steps performed by the access network network element, the communication unit 1210 is configured to receive first data; and the communication unit 1210 is further configured to receive second data. The communication unit 1210 is further configured to receive indication information from the user plane function network element; and the processing unit 1220 is configured to determine a sending priority of the second data based on the indication information. For descriptions of the first data, the second data, and the indication information, refer to related descriptions in the method embodiments shown in FIG. 6 to FIG. 11. Details are not described herein again.

In a design, when determining the sending priority of the second data based on the indication information, the processing unit 1220 is specifically configured to: determine, based on the indication information, that the sending priority of the second data is higher than that of the first data.

In a design, the communication unit 1210 is further configured to send first information to the user plane function network element, where the first information indicates a receiving response to the first data. For descriptions of the first information, refer to related descriptions in the method embodiments shown in FIG. 6 to FIG. 11.

In a design, the communication unit 1210 is further configured to receive second information from a session management function network element, where the second information includes the indication information. For descriptions of the second information, refer to related descriptions in the method embodiments shown in FIG. 6 to FIG. 11.

For example, when the apparatus 1200 performs steps performed by the policy control function network element, the communication unit 1210 is configured to receive indication information from the application server; and the processing unit 1220 is configured to generate a first quality of service QoS flow and a second QoS flow based on the indication information. The communication unit 1210 is further configured to send policy information of the first QoS flow and policy information of the second QoS flow to the session management function network element. For descriptions of the indication information, the first QoS flow, the second QoS flow, and the policy information, refer to related descriptions shown in FIG. 6 to FIG. 11.

For example, when the apparatus 1200 performs steps performed by the access network network element, the communication unit 1210 is configured to receive first data, where the first data includes first indication information; and the processing unit 1220 is configured to determine a sending priority of the first data based on the first indication information. For descriptions of the first data and the first indication information, refer to related descriptions in the method embodiments shown in FIG. 6 to FIG. 11.

In a design, the communication unit 1210 is further configured to receive second indication information from the session management function network element. For descriptions of the second indication information, refer to related descriptions in the method embodiments shown in FIG. 6 to FIG. 11.

For example, when the apparatus 1200 performs steps performed by the application server, the processing unit 1220 is configured to send first data to the access network network element by using the communication unit 1210 through the user plane function network element, where the first data includes first indication information, and the first indication information indicates a sending sequence of data packets of the first data in the apparatus. For descriptions of the first data and the first indication information, refer to related descriptions in the method embodiments shown in FIG. 6 to FIG. 11. Details are not described herein again.

Alternatively, the foregoing apparatus may be a chip. The communication unit may be an input/output circuit or an interface of the chip. The processing unit may be a logic circuit, and the logic circuit may process to-be-processed data according to the steps described in the foregoing methods, to obtain processed data. The output circuit/interface is configured to output the processed data.

Figure 13:
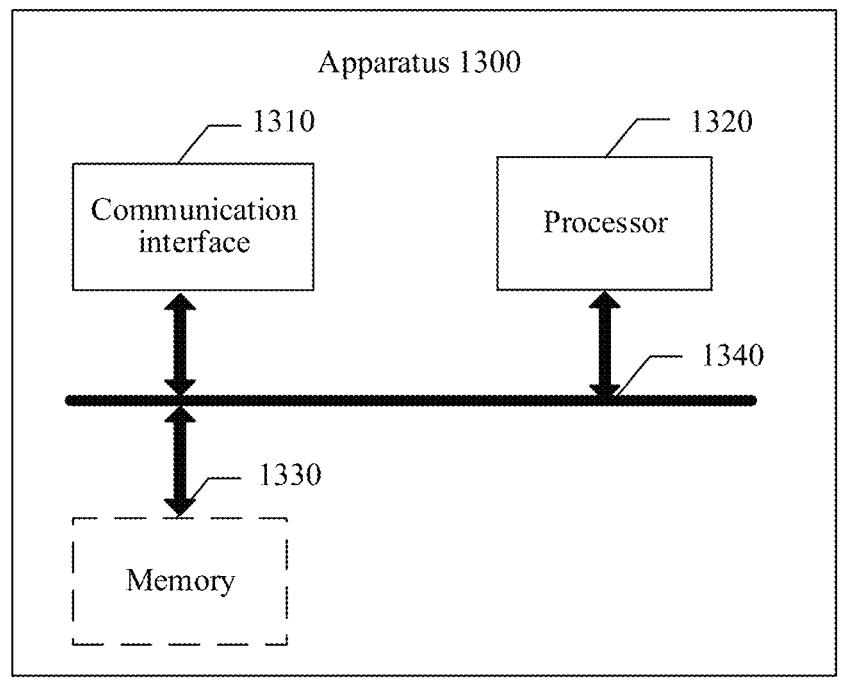
FIG. 13 is a block diagram of an apparatus with a communication function according to an embodiment of this disclosure.

FIG. 13 shows an apparatus 1300 with a communication function according to an embodiment of this disclosure. The apparatus 1300 is configured to implement functions of the user plane function network element, the access network network element, the policy control function network element, and the application server in the foregoing methods. The apparatus 1300 may be the user plane function network element, the access network network element, the policy control function network element, and the application server, or may be a chip similar to the user plane function network element, the access network network element, the policy control function network element, and the application server, or may be an apparatus that can be used with the user plane function network element, the access network network element, the policy control function network element, and the application server for matching.

Figure 12:
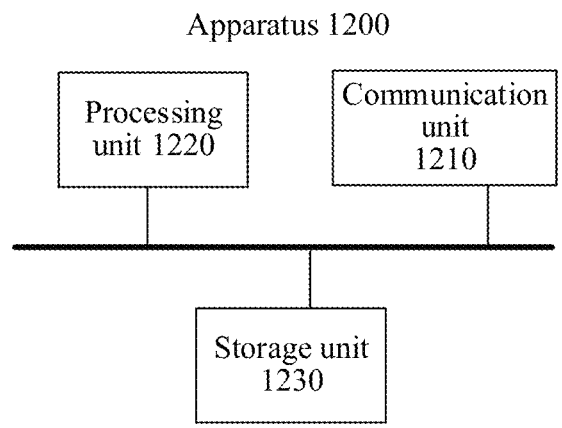
FIG. 12 is a schematic diagram of an apparatus with a communication function according to an embodiment of this disclosure.

The apparatus 1300 includes at least one processor 1320, configured to implement functions of the user plane function network element, the access network network element, the policy control function network element, and the application server in the methods provided in embodiments of this disclosure. The apparatus 1300 may further include a communication interface 1310. In embodiments of this disclosure, the communication interface may be a transceiver, a circuit, a bus, a module, or a communication interface of another type, and is configured to communicate with another device through a transmission medium. For example, the communication interface 1310 is used by an apparatus in the apparatus 1300 to communicate with another device. The processor 1320 may implement a function of the processing unit 1220 shown in FIG. 12, and the communication interface 1310 may implement a function of the communication unit 1210 shown in FIG. 12.

The apparatus 1300 may further include at least one memory 1330, configured to store program instructions and/or data. The memory 1330 is coupled to the processor 1320. The coupling in this embodiment of this disclosure may be an indirect coupling or a communication connection between apparatuses, units, or modules in an electrical form, a mechanical form, or another form, and is used for information exchange between the apparatuses, the units, or the modules. The processor 1320 may operate in collaboration with the memory 1330. The processor 1320 may execute the program instructions stored in the memory 1330. At least one of the at least one memory may be included in the processor.

In this embodiment of this disclosure, a specific connection medium between the communication interface 1310, the processor 1320, and the memory 1330 is not limited. In this embodiment of this disclosure, the memory 1330, the processor 1320, and the communication interface 1310 are connected through a bus 1340 in FIG. 13. The bus is represented by a bold line in FIG. 13. A connection manner between other components is merely an example for description, and is not limited thereto. The bus may be classified into an address bus, a data bus, a control bus, and the like. For ease of representation, only one bold line is used to represent the bus in FIG. 13, but this does not mean that there is only one bus or only one type of bus.

In another form of this embodiment, a computer-readable storage medium is provided, and the storage medium stores instructions. When the instructions are executed, a method on a user plane function network element side, an access network network element side, a policy control function network element side, or an application server side in the foregoing method embodiments is performed.

In another form of this embodiment, a computer program product including instructions is provided. When the instructions are executed, a method on a user plane function network element side, an access network network element side, a policy control function network element side, or an application server side in the foregoing method embodiments is performed.

In another form of this embodiment, a communication system is provided, and the system may include the foregoing at least one first user plane function network element, at least one access network network element, at least one policy control function network element, and at least one application server.

It should be understood that the processor mentioned in embodiments of the present disclosure may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of the present disclosure may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative descriptions, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this disclosure. The execution sequences of the processes should be determined based on functions and internal logic of the processes, and should not be construed as any limitation on an implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatuses, and units, refer to a corresponding process in the foregoing method embodiments. Details are not described herein again.

In the several embodiments provided in this disclosure, it should be understood that the disclosed system, apparatuses, and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to a current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication method, comprising:
   receiving, by a user plane function network element, second data;
   determining, by the user plane function network element based on first information, that the second data is retransmitted data of first data, wherein both the first data and the second data are data sent by an application server to a user side; and
   sending, by the user plane function network element, first indication information to an access network network element, wherein the first indication information indicates that the second data is the retransmitted data, or the first indication information indicates a sending priority of the second data.

2. The method according to claim 1, further comprising:
   receiving, by the user plane function network element, the first information from the application server, wherein the first information comprises a data packet sequence number difference threshold.

3. The method according to claim 2, wherein determining, by the user plane function network element based on the first information, that the second data is the retransmitted data of the first data comprises:
   determining, by the user plane function network element, that a difference between a data packet sequence number of the second data and a data packet sequence number of adjacent data exceeds the data packet sequence number difference threshold.

4. The method according to claim 1, further comprising:
   receiving, by the user plane function network element, the first information from the access network network element, wherein the first information indicates a receiving response to the first data.

5. The method according to claim 4, wherein determining, by the user plane function network element based on first information, that the second data is the retransmitted data of the first data comprises:
   determining, by the user plane function network element, that the first information does not comprise the receiving response to the first data.

6. The method according to claim 1, wherein the first indication information is identification information of a first quality of service (QOS) flow, the first data is sent through a second QoS flow, and a priority of the first QoS flow is higher than that of the second QoS flow.

7. A communication method, comprising:
   receiving, by an access network network element, second data;
   receiving, by the access network network element, first indication information from a user plane function network element, wherein the first indication information indicates that the second data is retransmitted data of first data, or indicates a sending priority of the second data, and both the first data and the second data are data sent by an application server to a user side; and
   determining, by the access network network element, the sending priority of the second data based on the first indication information.

8. The method according to claim 7, wherein determining, by the access network network element, the sending priority of the second data based on the first indication information comprises:

determining, by the access network network element based on the first indication information, that the sending priority of the second data is higher than that of the first data.

9. The method according to claim 7, further comprising:
sending, by the access network network element to the user plane function network element, first information indicating a receiving response to the first data.

10. The method according to claim 7, further comprising:
receiving, by the access network network element from a session management function network element, second information comprising the first indication information.

11. The method according to claim 7, wherein the first indication information is identification information of a first quality of service (QOS) flow, the first data is sent through a second QoS flow, and a priority of the first QOS flow is higher than that of the second QoS flow.

12. A communication apparatus,
a processor, and
a memory coupled to the processor and configured to store a computer program, the computer program comprising instructions that, when executed by the processor, cause the communication apparatus to perform the following:
receiving second data;
determining, based on first information, that the second data is retransmitted data of first data, wherein both the first data and the second data are data sent by an application server to a user side; and
sending first indication information to an access network network element, wherein the first indication information indicates that the second data is the retransmitted data, or the first indication information indicates a sending priority of the second data.

13. The apparatus according to claim 12, the computer program further comprising instructions that, when executed by the processor, cause the communication apparatus to perform the following:
receiving the first information from the application server, wherein the first information comprises a data packet sequence number difference threshold.

14. The apparatus according to claim 13, wherein determining, based on the first information, that the second data is the retransmitted data of the first data comprises:
determining that a difference between a data packet sequence number of the second data and a data packet sequence number of adjacent data exceeds the data packet sequence number difference threshold.

15. A communication apparatus,
a processor, and
a memory coupled to the processor and configured to store a computer program, the computer program comprising instructions that, when executed by the processor, cause the communication apparatus to perform the following:
receiving second data;
receiving first indication information from a user plane function network element, wherein the first indication information indicates that the second data is retransmitted data of first data, or indicates a sending priority of the second data, and both the first data and the second data are data sent by an application server to a user side; and
determining the sending priority of the second data based on the first indication information.

16. The apparatus according to claim 15, wherein determining the sending priority of the second data based on the first indication information comprises:
determining, based on the first indication information, that the sending priority of the second data is higher than that of the first data.

* * * * *